United States Patent
Lau et al.

(10) Patent No.: US 9,979,759 B2
(45) Date of Patent: May 22, 2018

(54) SYSTEM AND METHOD FOR MANAGING MULTI-MEDIA CONFERENCES USING GROUP SEGMENTATION

(71) Applicant: Tata Communications (America) Inc., Herndon, VA (US)

(72) Inventors: Stephen K Lau, Marlboro, NJ (US); James Leo Murtaugh, III, Holmdel, NJ (US); Joseph W Nocchi, Manasquan, NJ (US); Lee Joseph Wilson, Freehold, NJ (US)

(73) Assignee: Tata Communications (America) Inc., Herndon, VA (US)

( * ) Notice: Subject to any disclaimer, the term of this patent is extended or adjusted under 35 U.S.C. 154(b) by 68 days.

(21) Appl. No.: 15/266,356

(22) Filed: Sep. 15, 2016

(65) Prior Publication Data

US 2017/0093936 A1  Mar. 30, 2017

Related U.S. Application Data

(60) Provisional application No. 62/233,459, filed on Sep. 28, 2015.

(51) Int. Cl.
*H04M 3/42* (2006.01)
*H04L 29/06* (2006.01)
*H04M 3/56* (2006.01)

(52) U.S. Cl.
CPC ............ *H04L 65/403* (2013.01); *H04M 3/56* (2013.01); *H04L 65/1006* (2013.01)

(58) Field of Classification Search
CPC ....... H04L 65/403; H04L 65/106; H04M 3/56
USPC .............................................. 379/202.01, 158
See application file for complete search history.

(56) References Cited

U.S. PATENT DOCUMENTS

| | | | | |
|---|---|---|---|---|
| 2010/0124321 | A1* | 5/2010 | Alexandrov | H04M 3/56 379/202.01 |
| 2014/0126710 | A1* | 5/2014 | Boss | H04M 3/56 379/202.01 |
| 2014/0210939 | A1* | 7/2014 | Mock | H04N 7/152 348/14.03 |
| 2015/0358472 | A1* | 12/2015 | Rosenberg | H04M 3/56 370/235 |
| 2016/0373693 | A1* | 12/2016 | Segal | H04N 7/15 |

(Continued)

*Primary Examiner* — William Deane, Jr.
(74) *Attorney, Agent, or Firm* — Kaplan Breyer Schwarz, LLP

(57) ABSTRACT

A conference management system that is capable of managing one or more panels within a teleconference. The conference manager is capable of receiving commands for the purposes of configuring one or more panels and, during a teleconference, activating various panels at various times. In particular, the conference manager is configured to add participants in a teleconference to a panel. The conference manager is also configured to activate a panel, which has the effect of unmuting the audio and video media of the participants previously identified as members of the panel. The conference manager can be further configured to restore the conference to its previous mode, such as a lecture mode in which a lecturer participant is identified as a permanent speaker such that activating and deactivating a panel does not result in the lecturer being muted. Muting treatments other than activating a panel can also be applied to the teleconference.

20 Claims, 9 Drawing Sheets

(56) References Cited

U.S. PATENT DOCUMENTS

2017/0019436 A1\* 1/2017 Madabhushi ....... H04M 3/2227
2017/0048490 A1\* 2/2017 Martinez ................ H04N 7/147

\* cited by examiner

200

SYSTEM AND METHOD FOR MANAGING MULTI-MEDIA CONFERENCES USING GROUP SEGMENTATION

CROSS REFERENCE TO RELATED APPLICATION

The following document is incorporated by reference herein: U.S. Provisional Application Ser. No. 62/233,459, filed Sep. 28, 2015. If there are any contradictions or inconsistencies in language between this application and the document that has been incorporated by reference that might affect the interpretation of the claims in this application, the claims in this application should be interpreted to be consistent with the language in this application.

FIELD OF THE INVENTION

The present invention relates to telecommunications in general, and, more particularly, to controlling a teleconference having one or more panels of participants, or other type of group segmentation.

BACKGROUND OF THE INVENTION

FIG. 1 depicts a schematic diagram of telecommunications system 100 in the prior art. System 100 comprises telecommunications network 101 and communication endpoints 102-1 through 102-10, interconnected as shown.

Telecommunications network 101 is a network that provides telecommunications access and connectivity to the depicted communication endpoints.

Network 101 is managed by one or more telecom providers or operators, and provides bandwidth for various communications services and network access to communication endpoints, such as endpoints 102-1 through 102-10. One of the services provided by network 101 is teleconferencing, including audio, web, and video teleconferencing. A "teleconference" is a conference, or other formal meeting for discussion, with participants in different locations linked by telecommunications devices.

Each communication endpoint 102-$i$, wherein $i$ is a positive integer, is a node or terminal that provides access to one or more telecommunications services, such as audio or video conferencing, for one or more people or machines, or both. The communication endpoints can be within one or more communications service provider (CSP) networks or one or more enterprise networks, or both.

FIG. 2 depicts conference roster 200 in the prior art. Conference roster 200 is a representation of the one or more teleconferences that are being managed by telecommunications network 101 at any given moment, and that are being attended by one or more participants through their corresponding endpoints. As depicted, Conference 1 is being attended by Bob, Carol, and Ted on endpoints 102-1, 102-9, and 102-4, respectively. These endpoints are tied into Conference 1 through Conference Bridge 1, which can be referring to a distinct piece of equipment. Conference 1 is also being attended by Alice, John, Paul, and Jane on endpoints 102-2, 102-7, 102-5, and 102-6, respectively. These endpoints are tied into Conference 1 through Conference Bridge 2, which refers to a distinct piece of equipment that is different from Bridge 1. In general, one or more teleconference bridges can be used to support all of the endpoints associated with a given teleconference, and, at any given moment, one or more teleconferences can be either scheduled to occur or in progress, or both.

Conference roster 200 is typically presented on a display and viewable by a teleconference administrator or other user, who has the responsibility of administering, at some predetermined level of control, one or more teleconferences while they are proceeding. The conference roster is typically viewable through a web browser or some other type of display application, which presents the roster information to the administrator.

In regard to the teleconference participants themselves, all participants on a given teleconference have in common the fact that they are all on the same teleconference. In addition, some participants in a given teleconference might have one or more additional attributes in common that, at the same time, are not possessed by one or more other participants in the same teleconference. Some of these attributes might be relevant to the teleconference, and managing such relevant attributes would be beneficial to the teleconference.

SUMMARY OF THE INVENTION

Teleconferences often comprise one or more panels of participants. Within the context of a teleconference, a "panel" is a group of participants brought together to discuss, investigate, or decide on a particular matter. The participants on a given panel possess and share at least one teleconference-relevant attribute that is not possessed or shared by one or more other participants of the teleconference. A panel on a teleconference can be considered analogous to a panel of featured speakers during a presentation at an in-person conference or other event. The panel of speakers typically does most of the communicating during the presentation, with allowances for questions from participants in the audience who may speak when asking a question or providing a comment to the panel, but who otherwise are expected to be silent when a participant from the panel of speakers is talking.

Attempts have been made to provide to a teleconference the look and feel of an in-person event, such as an in-person conference taking place in an auditorium or other same-room venue. In regard to the actual implementation of the concept of panels on a teleconference, however, problems often occur. For example, in at least some conventional teleconference systems, a conference administrator manually has to keep track of which participants belong to a panel and which do not. When a panel member is speaking, the administrator has to mute the outgoing audio and/or video of non-members, so that they do not interrupt the panel and disrupt the other audience participants. And when the non-member in the audience has a turn to speak, the conference administrator has to unmute the non-member and, possibly, mute the panel members so as not to interrupt the audience participant who is speaking.

This might or might not be manageable if there are a relatively small number of audience participants or a small number of panel-member participants. But this type of manual muting and unmuting back-and-forth between panel participants and audience participants becomes unwieldy when there are a large number of participants on a teleconference—indeed, some teleconferences have numbered in the hundreds of participants. Moreover, the problems are exacerbated when there are multiple panels to coordinate, instead of just one. At least some of the teleconference systems available in the prior art do not offer a mechanism for unmuting a predefined subset of a teleconference to join a discussion.

The present invention enables the improved control of a teleconference having one or more panels, or other type of group segmentation, without at least some of the disadvantages in the prior art. The conference management system disclosed herein is capable of managing one or more teleconferences and one or more panels within each teleconference. In accordance with the illustrative embodiment, the conference management system is capable of receiving one or more commands from a conference controlling client for the purposes of configuring one or more panels and, during a teleconference, activating various panels at various times.

In particular, the conference manager of the illustrative embodiment is configured to add participants in a teleconference to a panel, either before or during the teleconference. The conference manager is also configured to activate a panel, which has the effect of unmuting the audio media, video media, and/or other media of the participants who were previously identified as being members of the panel. The conference manager can be further configured to restore the conference to its previous mode, such as a lecture mode in which a lecturer participant is identified as a permanent speaker such that activating and deactivating a panel does not result in the lecturer being muted. Muting treatments other than activating a panel can also be applied to the teleconference, as disclosed herein.

Advantageously, at least some of the capabilities disclosed herein enable the conference to be switched from a first muting treatment or mode (e.g., lecture mode) to a second muting treatment or mode (e.g., panel mode) quickly, seamlessly, and with little or no real-time human errors. Furthermore, at least some conference systems in the prior art have a group identified as "Presenters" and another group identified as "Participants", in which the Participants are muted during the presentation. In such conference systems in the prior art, such Presenters and Participants are preconfigured and cannot be changed during the teleconference. In contrast, the conference manager of the illustrative embodiment can change and add panels while the teleconference is in progress.

The features disclosed herein are not limited to large teleconferences, although the utility of the features can increase as the number of teleconference participants increases. The disclosed features are particularly valuable when a subset of participants in a conference need to have their audio, video, and/or data media exposed to the teleconference, in order to allow this subset to discuss a topic while the remaining participants are prevented from interrupting the media being presented to the teleconference at large.

An illustrative conference system for controlling a teleconference comprises: a first data-processing system comprising: (i) a processor that is configured to modify a first database record to identify a first group of participants in a teleconference as belonging to a first panel, wherein the teleconference is preconfigured to have, in addition to the first group of participants, a second group of participants who are non-members of the first panel, and (ii) a receiver that is configured to receive a first representational state transfer (REST) application program interface (API) call from a second data-processing system indicating that a first muting treatment is to be applied to the teleconference; and a first bridging device that is configured to apply the first muting treatment to the teleconference such that i) a first muting state is applied to all of the participants in the first group as identified in the first database record and ii) a second muting state is applied to at least one of the participants in the second group, concurrently with each other.

An illustrative method for controlling a teleconference comprises: modifying, by a first data-processing system, a first database record to identify a first group of participants in a teleconference as belonging to a first panel, wherein the teleconference is preconfigured to have, in addition to the first group of participants, a second group of participants who are non-members of the first panel; receiving, by the first data-processing system, a first representational state transfer (REST) application program interface (API) call from a second data-processing system indicating that a first muting treatment is to be applied to the teleconference; and applying, by the first data-processing system to the teleconference, the first muting treatment such that i) a first muting state is applied to all of the participants in the first group as identified in the first database record and ii) a second muting state is applied to at least one of the participants in the second group, concurrently with each other.

An illustrative non-transitory computer-readable medium storing a computer program comprises computer-readable instructions that, when loaded and executed on a computer system, cause the computer system to perform the steps of a method according to any one of the method claims disclosed herein.

DETAILED DESCRIPTION

Figure 1:
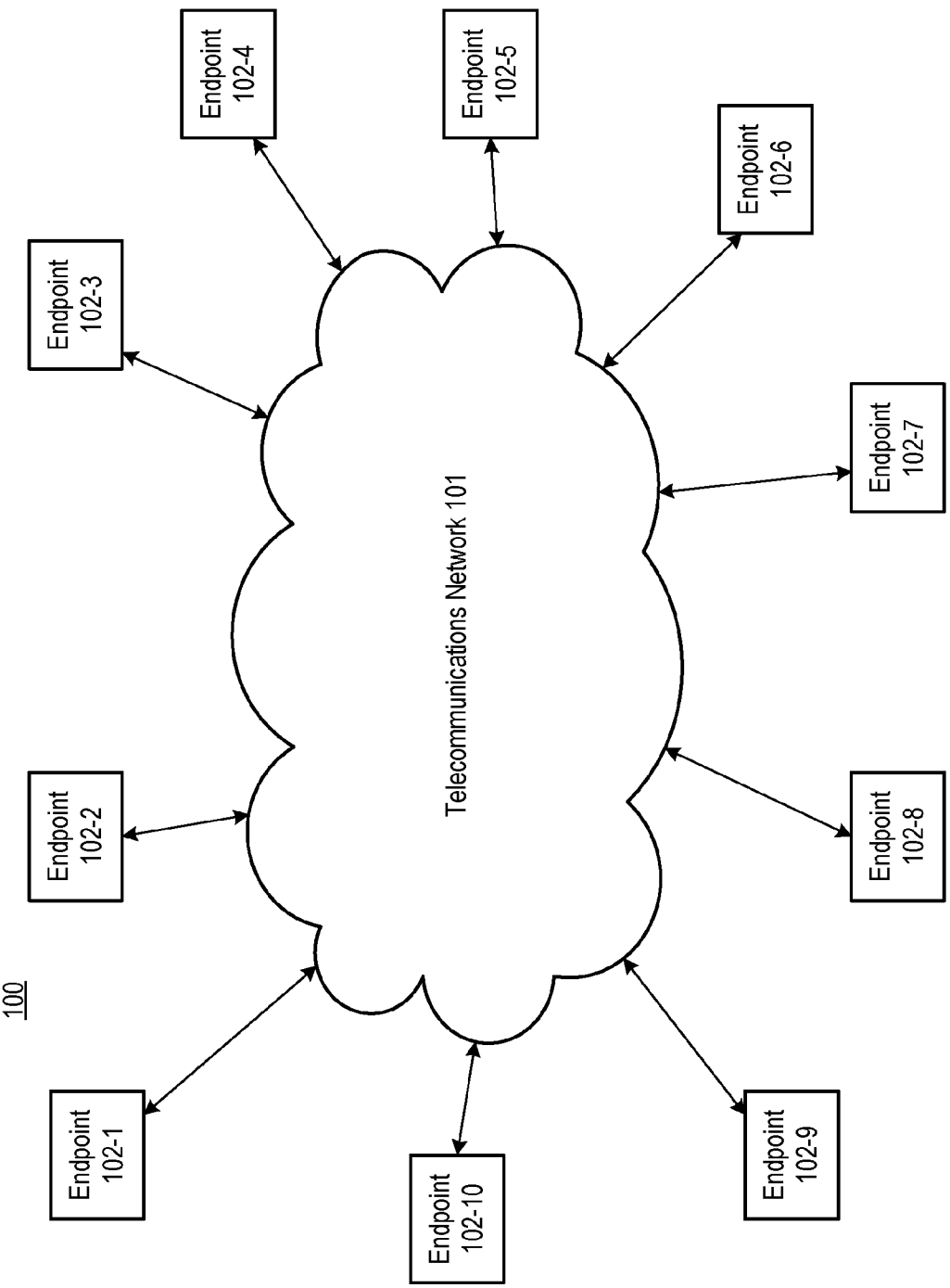
FIG. 1 depicts a schematic diagram of telecommunications system 100 in the prior art.
Figure 2:
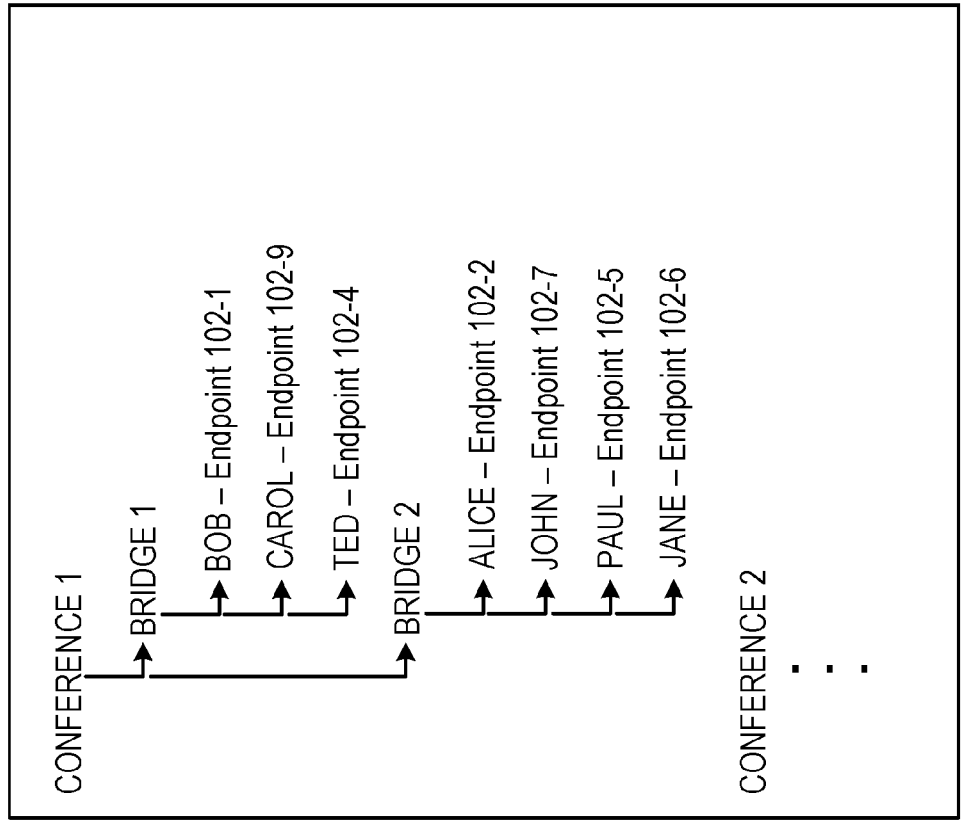
FIG. 2 depicts conference roster 200 in the prior art.
Figure 3:
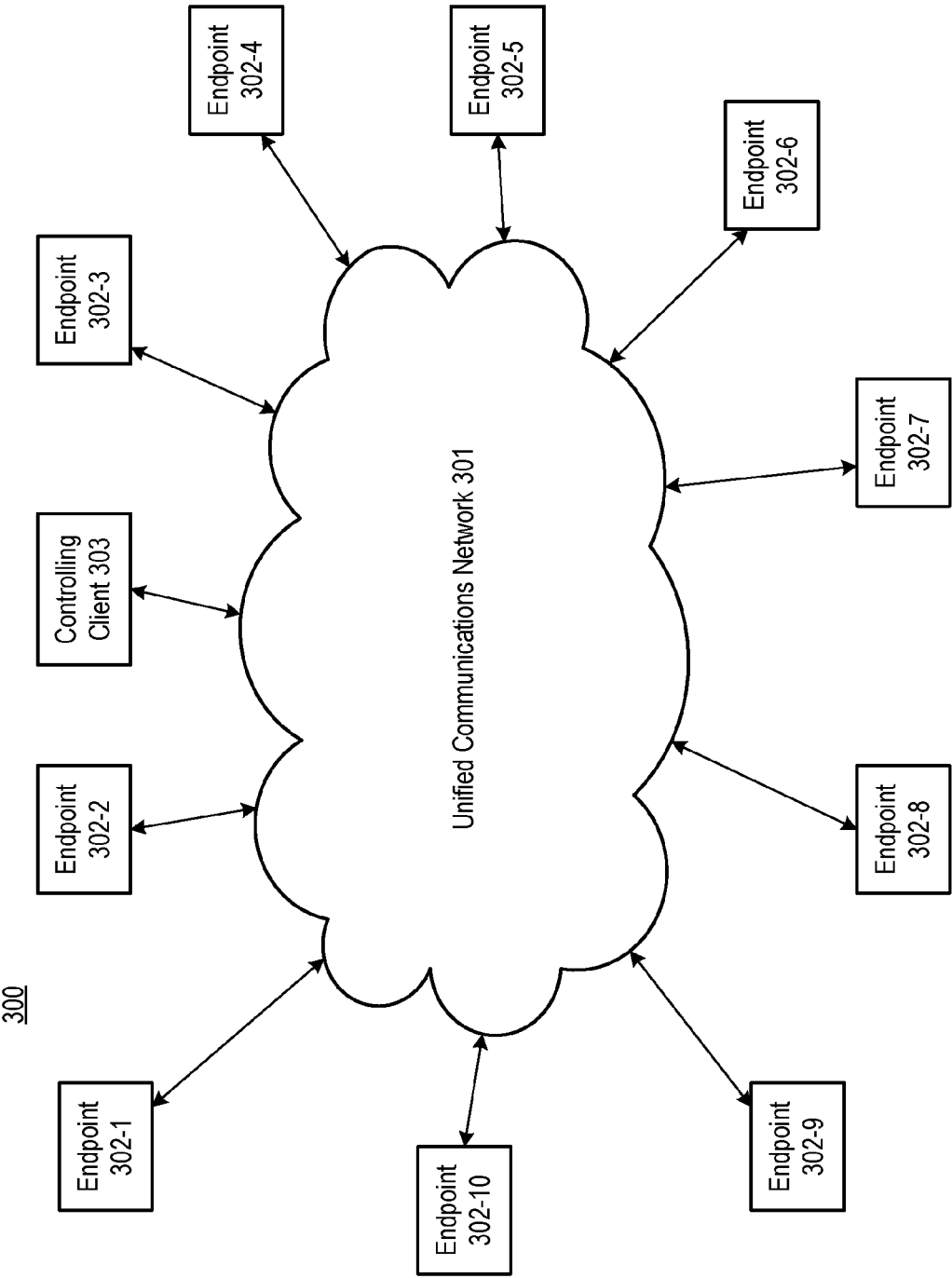
FIG. 3 depicts a schematic diagram of telecommunications system 300, in accordance with the illustrative embodiment of the present disclosure.

FIG. 3 depicts a schematic diagram of telecommunications system 300, in accordance with the illustrative embodiment of the present disclosure. System 300 comprises unified communications (UC) network 301, communication endpoints 302-1 through 302-M, and controlling client 303, interconnected as shown. M is a positive integer that has a value of 10 as depicted; however, as those who are skilled in the art will appreciate after reading this specification, M can have a different value.

UC network 301 is a network that provides telecommunications access and connectivity to the depicted endpoints. In accordance with the illustrative embodiment, network 301 is a backbone network; in some embodiments of the present disclosure, however, network 301 can be a different type of network (e.g., access network, etc.). Network 301 is managed by one or more backbone providers or operators, and provides bandwidth for various unified communications services and network access to communication endpoints in one or more communications service provider (CSP) networks and/or one or more enterprise networks. Generally, "unified communications" refers to the integration of real-time, enterprise, communication services. One of the services provided by network 301 is conferencing, including audio, web, and video conferencing.

UC network 301 comprises a conference management system such as conference manager 401, which is sometimes referred to herein as "a first data-processing system." As discussed below, conference manager 401 can receive messages (e.g., messages 803 and 903, etc.) from controlling client 303, which is sometimes referred to herein as "a second data-processing system," wherein the messages manage one or more conference panels in accordance with the illustrative embodiment of the present disclosure. The salient components of UC network 301 are described below and in FIG. 4.

Each communication endpoint 302-$m$, wherein m can have a value of between 1 and M, inclusive, is a node or terminal that provides access to one or more telecommunications services, such as audio or video conferencing, for one or more people or machines, or both. There can be any number of communication endpoints (or "endpoint" for short) associated with a communications service provider network (not depicted), any number of endpoints associated with an enterprise network (not depicted), and different numbers of such endpoints across the CSP and enterprise networks.

Controlling client 303 is a node or terminal that provides for the control of conferencing services, including the control of conferencing panels as disclosed herein. In accordance with the illustrative embodiment of the present disclosure, client 303 comprises a data-processing system that executes a web browser or equivalent, which can be used to control the conferencing panels. In some embodiments of the present disclosure, client 303 can be implemented at one of endpoints 302-1 through 302-M. Although a single controlling client is depicted, in some embodiments of the present disclosure there can be more than one controlling client.

Figure 4:
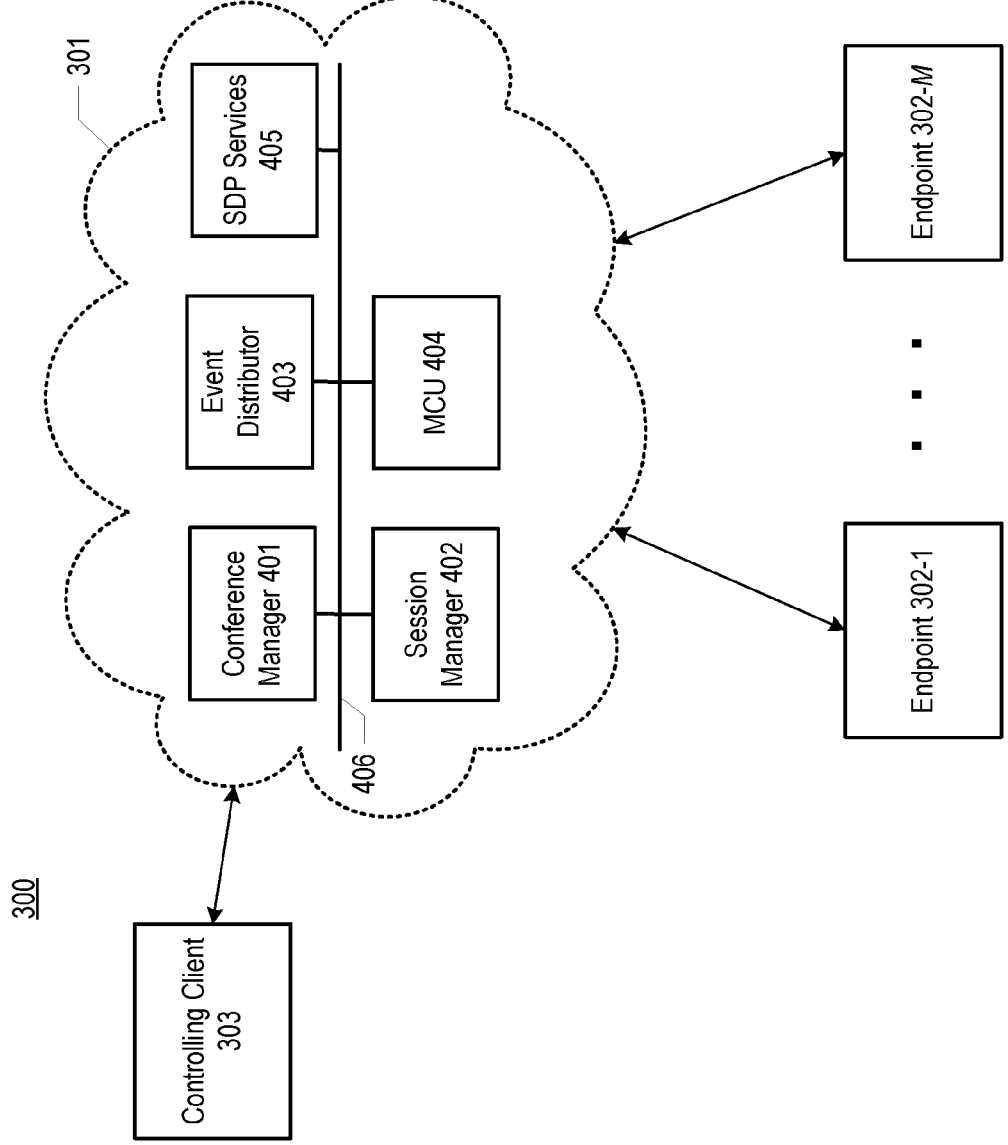
FIG. 4 depicts a schematic diagram of some of the salient data-processing systems within unified communications network 301.

FIG. 4 depicts a schematic diagram of some of the salient data-processing systems within unified communications network 301, in accordance with the illustrative embodiment of the present disclosure. Conference manager 401 is a data-processing system that is configured, as a conference management system, to manage one or more panels of one or more teleconferences, as described below. Manager 401 is also configured to receive events from one or more networks, such those in which endpoints 302-1 through 302-M and controlling client 303 are situated, and to act on the received events. In particular, conference manager 401 is configured to subscribe to event distributor 403 for specific entities, including service providers, customers/tenants, contacts, and virtual meeting rooms (VMR). In some embodiments of the present disclosure, manager 401's treatment of one or more panels can be based on one or more such events that it receives.

Conference manager 401 can also subscribe to specific events relevant to the specific entity or entities for which each entity subscription is initiated. Consequently, conference manager 401 can receive notifications of the subscribed-to events, such as conference-start and conference-end notifications, as well as participant-level notifications, such as participant-connect and participant-disconnect. The subscriptions are made by each conference manager instance that conference manager 401 executes, wherein an "instance" is described in further detail below and in FIG. 5. In some embodiments of the present disclosure, manager 401's treatment of one or more panels can be based on one or more such events that it receives.

Conference manager 401 interfaces with controlling client 303, session manager 402, event distributor 403, and MCU 404, as described below. Conference manager 401 is described in further detail below and in FIG. 5.

In addition to receiving and acting on events, conference manager 401 is configured to provide a converged conference view of participants. As conference events (e.g. start/end) are received from event distributor 403, conference manager 401 can maintain a current view of all active conferences in the network. Furthermore, conference manager 401 can maintain a current view of all participant legs and can maintain a current view of all active participants by using participant events (e.g. connect, disconnect) in notifications from event distributor 403. Manager 401 can provide some or all of these views to controlling client 303 for presentation to a user, in the form of a conference roster as described below and in FIG. 6.

Session manager (SM) 402 is a data-processing system configured to manage communication sessions among one or more telecommunications networks that serve different domains (e.g., a CSP network, an enterprise network, etc.) SM 402 enables the domain-serving networks to interact with one another in one or more communication sessions, such as through the Session Initiation Protocol (SIP), for example and without limitation. SM 402 enables inter-domain audio and video communication sessions among the domains. When interfaced with SM 402, each domain-serving network can continue to employ and operate its own methods and technology. In some embodiments, SM 402 can include session management, resource management, policy, and routing components, for a variety of different communication sessions including, but not limited to, audio and/or video based communication sessions, and applications such as web conferencing and any third party software that is designed to handle video or audio (e.g., voice, etc.). In some embodiments of the present disclosure, conference manager 401's treatment of one or more panels can be based on one or more functions performed by session manager 402.

SM 402 as depicted in FIG. 4 is part of UC network 301. However, SM 402 can physically and/or logically be part of a network different than UC network 301, as those who are skilled in the art will appreciate after reading this disclosure. Furthermore, SM 402 store one or more instances of session management functionality, wherein multiple instances can be implemented in UC network 301 (e.g., for multiple teleconferences, for resilience, etc.).

Event distributor 403 is a data-processing system that provides network management, reporting, analytics, mass provisioning, scheduling, billing, and conference management. For example and without limitation, event distributor 403 can comprise a server computer that executes software with network management functionality. Such functionality can include provisioning, scheduling, MCU allocation, monitoring, reporting, and/or billing capability, for example and without limitation. Event distributor 403 is configured to receive, from one or more MCUs 404, indications of conference- and participant-related events as they occur, as detected by the MCUs. Event distributor 403 is configured to receive subscriptions from conference manager 401, as described above, to monitor for events related to those entities identified in each subscription, and to report to conference manager 401 on events that occur within the scope of management of each conference management instance that executes on conference manager 401. In some embodiments of the present disclosure, conference manager 401's treatment of one or more panels can be based on one or more functions performed by event distributor 403.

In at least some embodiments of the present disclosure, event distributor 403 reports only on those events that occur within the scope of management of each instance, as specified in the subscriptions received from conference manager 401, rather than on every event reported to the event distributor by the one or more MCUs 404.

In some embodiments, the event notifications are made in the form of call-detail records (CDR). In general, a CDR is a data record that documents the details of a telephone call or other communications transaction. The record contains various attributes of the call, such as time, duration, completion status, source number, and/or destination number, for example and without limitation.

Multipoint control unit (MCU) 404 is a data-processing system that is configured to interconnect (i.e., "bridge") calls from multiple sources, and is sometimes referred to herein as being part of a "first bridging device." The multipoint control unit is a node in the network that provides the capability for multiple enterprise-associated endpoints to participate in a multipoint videoconference via bridging those endpoints. For example and without limitation, MCU 404 can comprise one or more Acano™ units with multipoint control functionality. In addition, MCU 404 can interface via a cascaded link with a conference in a CSP network. Although a single MCU is depicted as being associated with UC network 301, multiple MCUs can operate within UC network 301, as those who are skilled in the art will appreciate after reading this specification. Furthermore, one or more MCUs can be bridges, proxy servers, gateways, and any combination and number of media data-processing systems thereof. In some embodiments of the present disclosure, conference manager 401's treatment of one or more panels can be based on one or more functions performed by one or more MCUs 404.

In addition, MCU 404 is capable of notifying event distributor 403 of conference- and participant-related events as they occur. In some embodiments, the event notifications are made in the form of call-detail records (CDR).

Service delivery platform (SDP) services 405 provide a structure for service delivery, including controls for service sessions and protocols for service use. It is in this capacity that SDP services 405 can provide authentication (e.g., PIN-based, etc.) for one or more endpoints. The SDP data can keep conference manager 401 informed on the overall topology of unified communications network 301 (e.g., enterprises, contacts, virtual meeting rooms, etc.). In some embodiments of the present disclosure, conference manager 401's treatment of one or more panels can be based on one or more functions performed by SDP 405.

The aforementioned elements within UC network 301 are interconnected, at least in part, via network connectivity 406, which can comprise one or more subnetworks.

As those who are skilled in the art will appreciate, after reading this specification, a division of functionality that is different than in the description above is possible within UC network 301. For example and without limitation, at least some of the elements described above can be implemented on one or more server computers, or two or more of the elements described above can implemented on the same server computer, or both.

Figure 5:
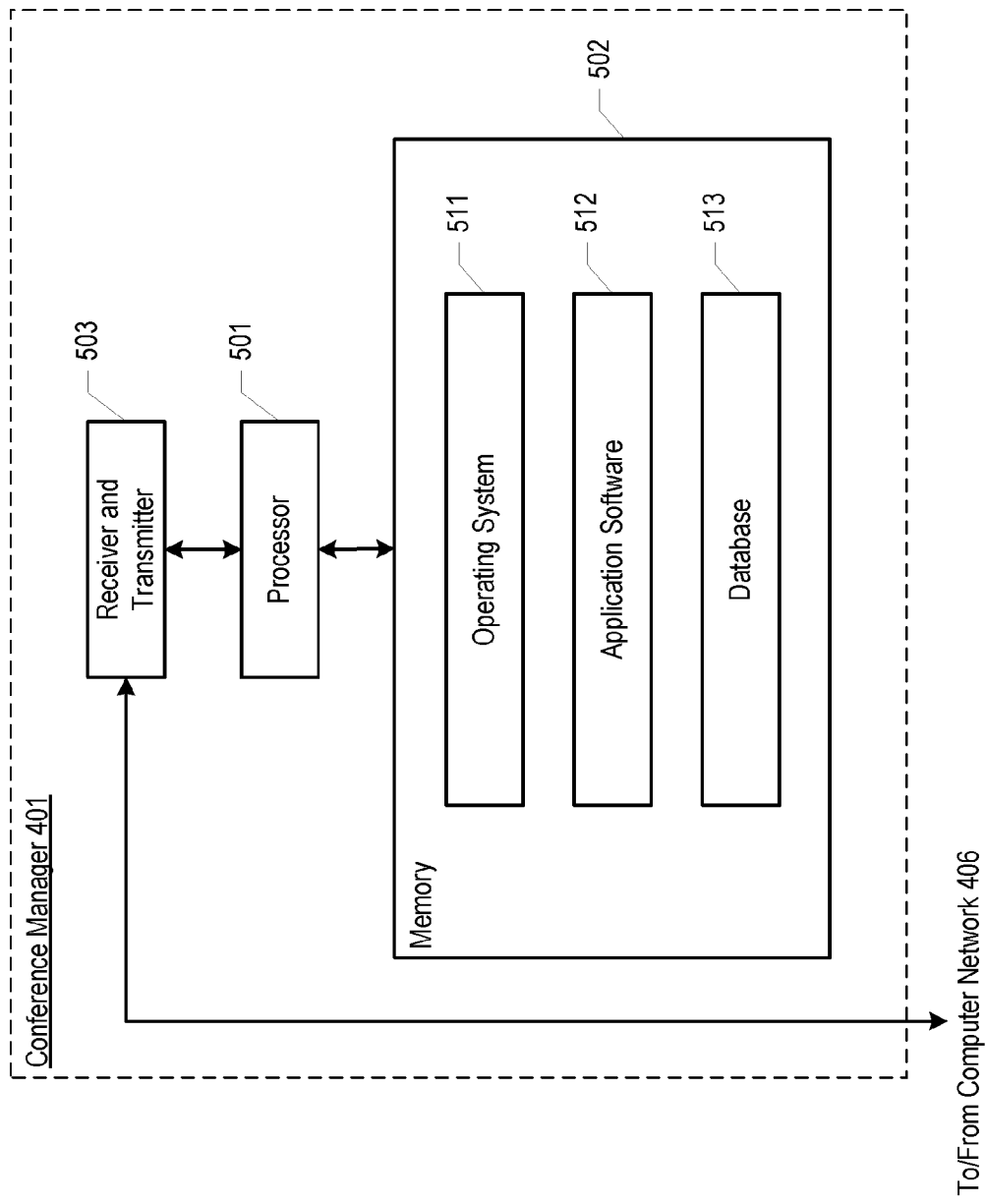
FIG. 5 depicts a schematic diagram of the conference manager 401 data-processing system.

FIG. 5 depicts a schematic diagram of the conference manager 401 data-processing system, in accordance with the illustrative embodiment of the present disclosure. Conference manager 401 can be implemented in hardware, software, or a combination of hardware and software. Although conference manager 401 is depicted as a single server computer, software components of conference manager functionality can reside in multiple server computers, or in one or more like computing devices or machines, for that matter. The server computers or like computing devices or machines can comprise one or more central processing units (processors) and one or more memory devices. The structure and function of such server computers and the like are well known to those skilled in the art.

In accordance with the illustrative embodiment of the present disclosure, conference manager 401 comprises, as a conference management system: processor 501, memory 502, and receiver and transmitter 503, which are interconnected as shown. In accordance with the illustrative embodiment of the present disclosure, conference manager 401 is a server computer. As those who are skilled in the art will appreciate after reading this specification, however, conference manager 401 can be a different type of data-processing system or computing device.

Figure 7:
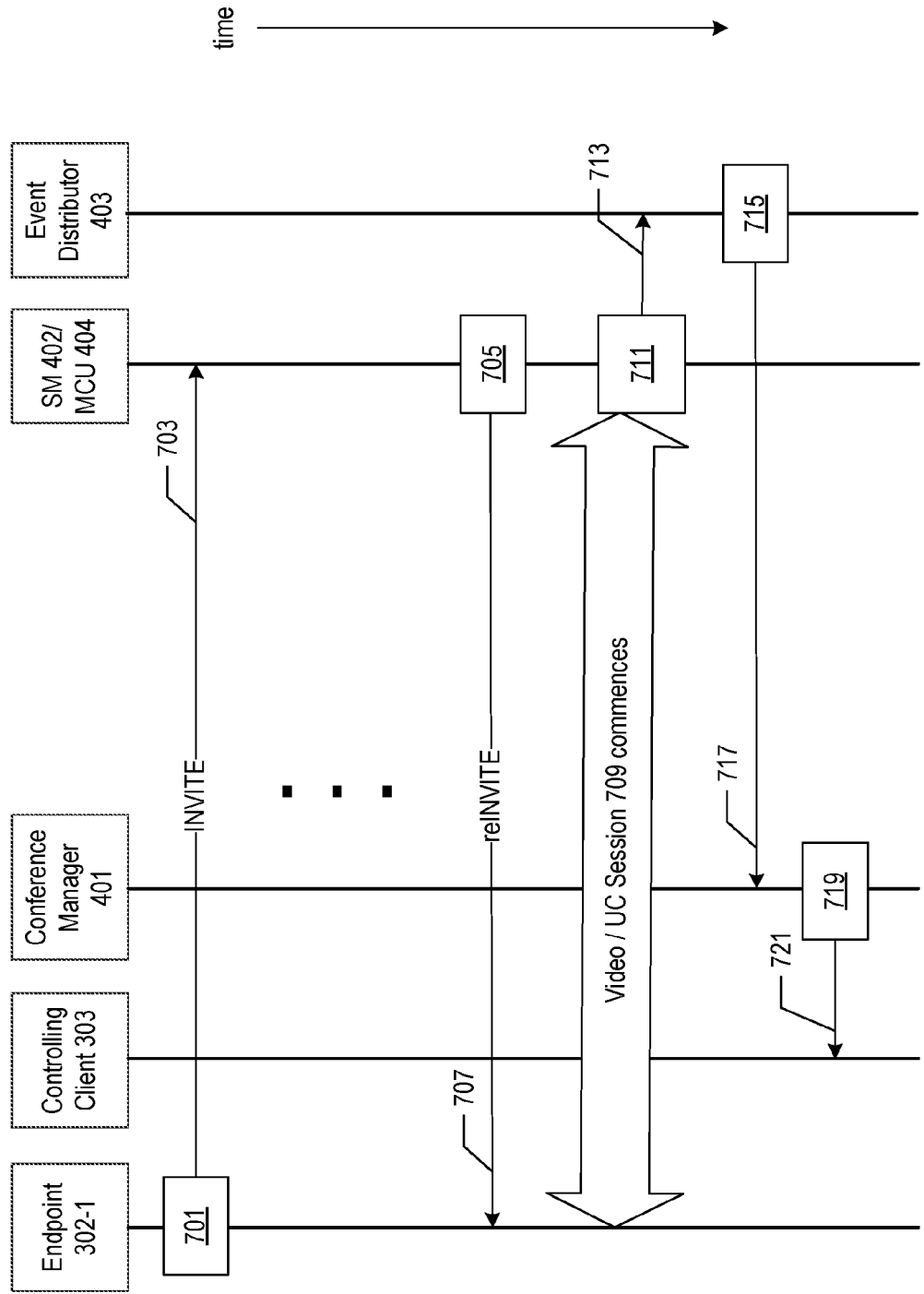
FIG. 7 depicts a message flow diagram associated with establishing a media link as part of a teleconference, and associated with reporting that event to conference manager 401 and controlling client 303.
Figure 8:
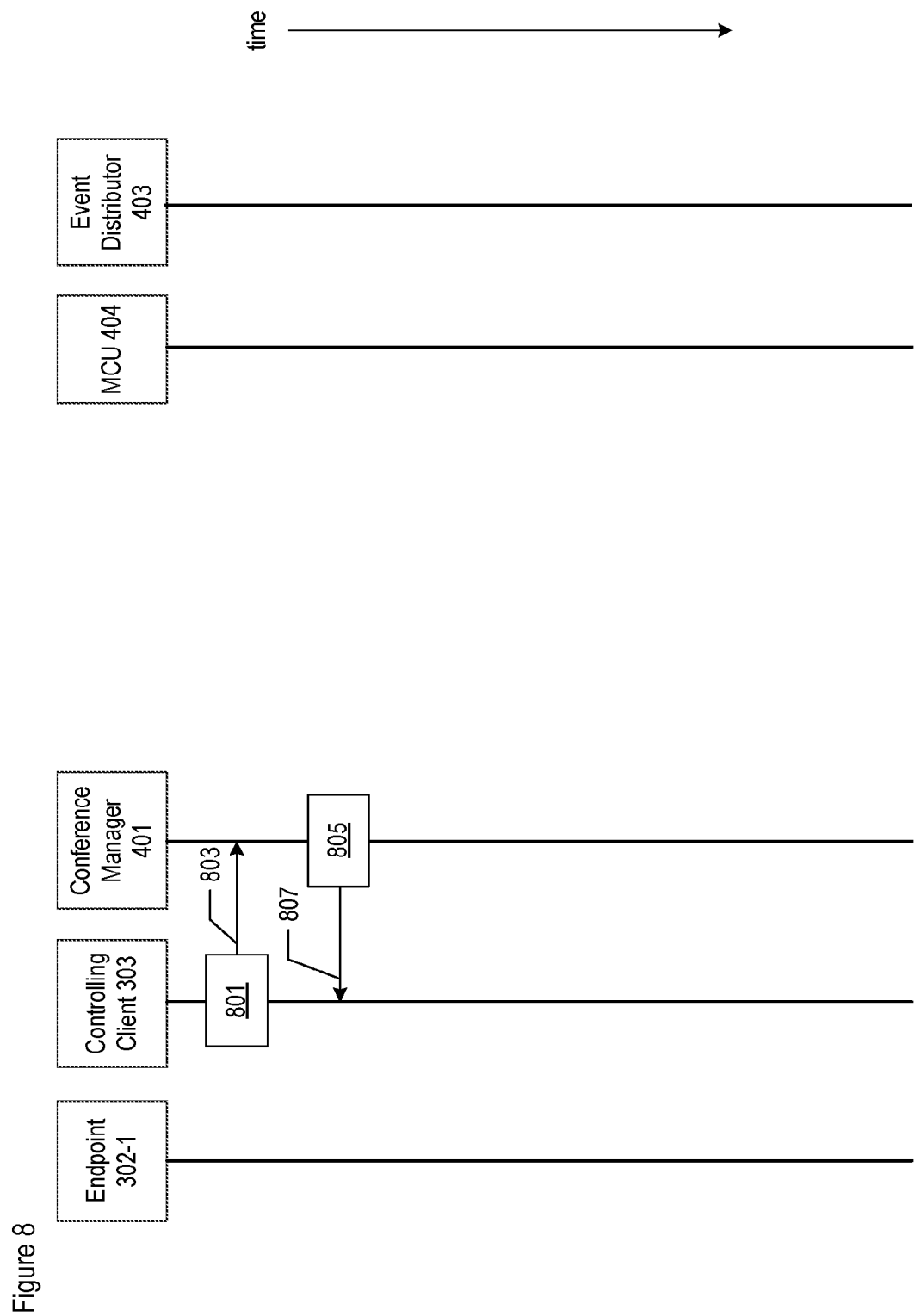
FIG. 8 depicts the modifying of the membership of a conference panel.
Figure 9:
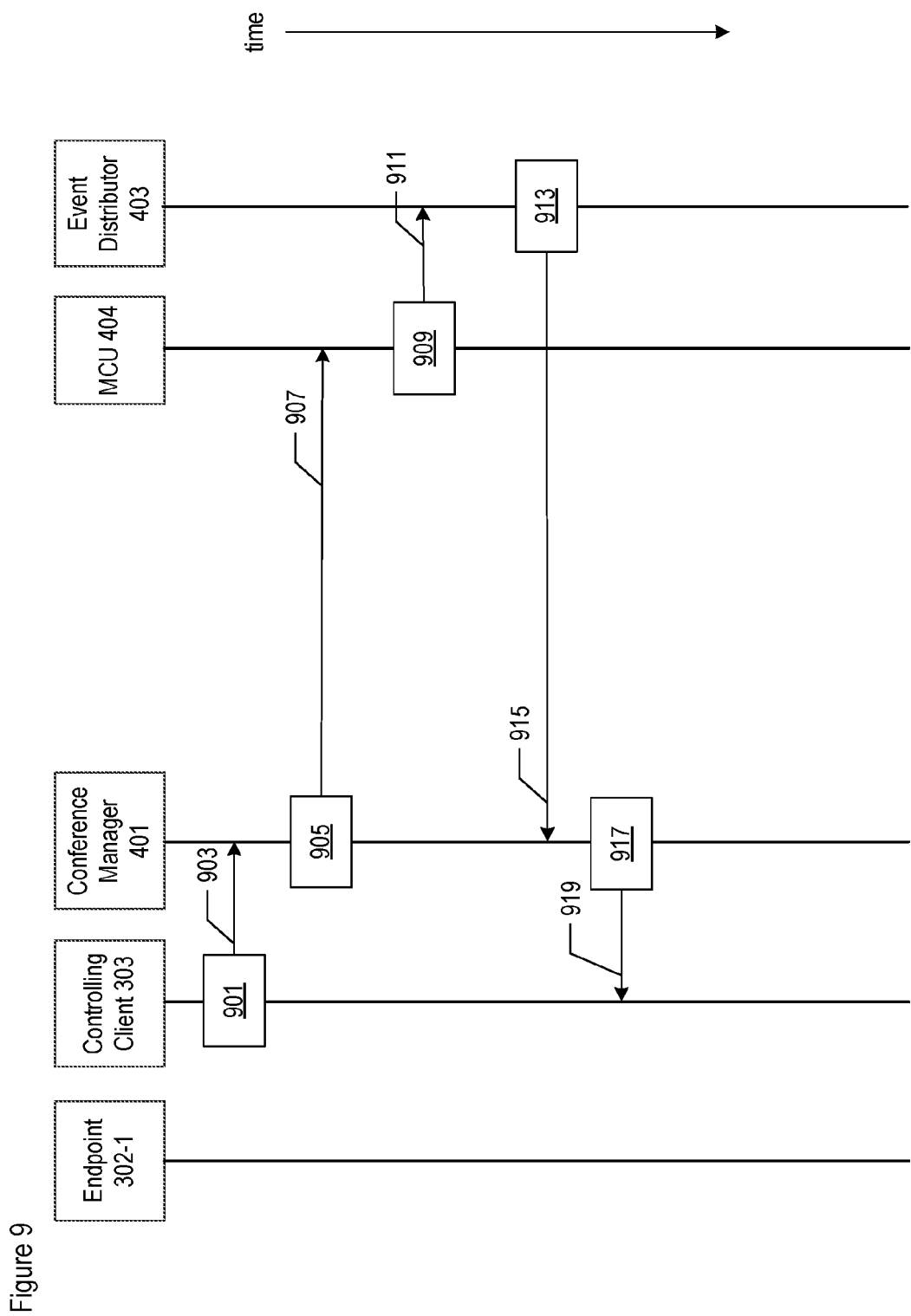
FIG. 9 depicts the application of a muting treatment to a conference panel.

Processor 501 is a general-purpose processor that is configured to execute an operating system and the application software that performs the operations described herein, including at least some of the operations described in FIGS. 7 through 9. It will be clear to those skilled in the art how to make and use processor 501.

Memory 502 is non-transitory and non-volatile memory that is configured to store:
 a. operating system 511, and
 b. application software 512, and
 c. database 513.

Memory 502 can store one or more software instances of conference manager functionality, wherein multiple instances can be implemented in UC network 301. For resilience purposes, a pair of conference manager instances can be implemented in a primary/standby arrangement. Each conference manager instance (or pair of instances) can be dedicated to handling a given set of entities within its management scope. For example and without limitation, a first instance can handle a first business enterprise customer and its service agreements with UC network 301 one or more CSP networks, a second instance can handle a second business enterprise customer and its service agreements, and so on.

Each conference management instance has multiple external software interfaces, including CSP adapters, SDP data access, recording services adapters, a session manager interface and/or MCU interfaces, and an event distributor interface.

Memory 502 is a non-transitory computer-readable medium storing a computer program comprising computer-readable instructions that, when loaded and executed on conference manager 401, cause manager 401 to perform at least some of the operations described herein.

It will be clear to those skilled in the art how to make and use memory 502.

Receiver and transmitter 503 is configured to conference manager 401 to receive from and transmit to other elements within telecommunications system 300, including controlling client 303, session manager 402, event distributor 403, and MCU 404, for example and without limitation. It will be clear to those skilled in the art how to make and use receiver and transmitter 503.

Figure 6:
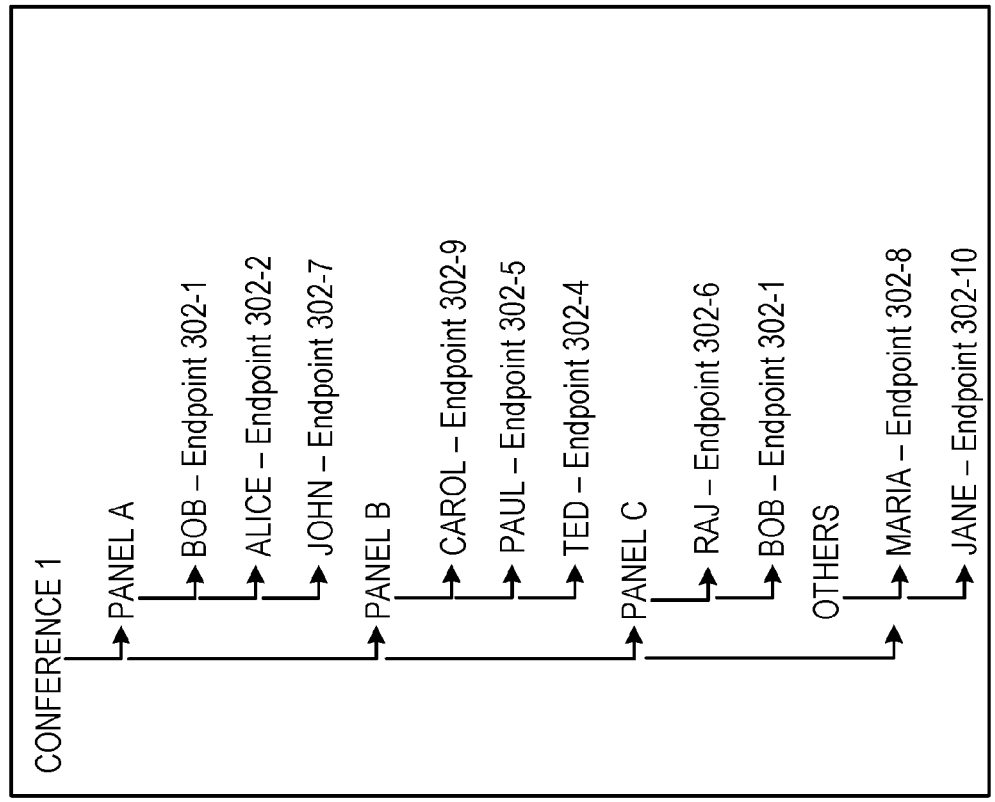
FIG. 6 depicts conference roster 600.

FIG. 6 depicts conference roster 600, in accordance with the illustrative embodiment of the present disclosure. Conference roster 600 is a representation of the one or more teleconferences that are being managed by conference manager 401 at any given moment, and being attended by one or more participants through their corresponding endpoints.

Roster 600 also represents the different panels within each conference and their members. As depicted, Conference 1 is being attended by Bob, Alice, and John on endpoints 302-1, 302-2, and 302-7, respectively, who are members of Panel A. Conference 1 is also being attended by Carol, Paul, and Ted on endpoints 302-9, 302-5, and 302-4, respectively, who are members of Panel B. Conference 1 is also being attended by Raj and Bob on endpoints 302-6 and 302-1, respectively, who are members of Panel C. Roster 600 depicts an example of panel membership that is mutually exclusive with each other, in that the membership of Panels A and B are mutually exclusive with respect to each other. Roster 600 also depicts an example of panel membership that has at least one member in common, in that the membership of Panels A and C both have Bob as a member. Conference manager 401 enables both types of panel relationships mentioned above, as well as other panel relationships. Roster 600 also depicts participants of Conference 1 who are not members of any panel: Maria and Jane on endpoints 302-8 and 302-10, respectively. In some embodiments of the present disclosure, conference 401 treats Maria and Jane as being members of a not explicitly defined panel (e.g., the "Others" panel, etc.).

Conference roster 600 is presented on a display at controlling client 303 and viewable by a teleconference administrator or other user, who has the responsibility of administering, at some predetermined level of control, one or more teleconferences while they are occurring. The conference roster is viewable through a web browser or some other type of display application at client 303, which presents the roster information to the administrator. In some embodiments of the present disclosure, the roster itself has selectable controls for modifying and activating the one or more panels by the user.

Conference roster 600 is updated based on controlling client 303 transmitting one or more conference management messages to conference manager 401. In some embodiments of the present disclosure, each of such messages is conveyed as a representational state transfer (REST) application program interface (API) call. As those who are skilled in the art will appreciate after reading this specification, however, one or more of the conference management messages can be conveyed in other ways—for example, as a different type of API call or a different type of message or protocol entirely (e.g., SIP, etc.).

Through conference manager 401, and as displayable on roster 600, the controlling user can predefine participants to be a member of a single panel or multiple panels using an add-to-panel command. The user is prompted for the panel name. The first participant added to the panel creates the panel. Once a panel has been defined, the user can invoke the activate panel command which, for example, can be used to mute the outgoing audio and video media from all participants who are not members of the panel, if necessary. The command can also unmute the audio and video media of participants who are members of the panel. In this example, any participant who is tagged as a permanent speaker will not be muted by the activated or deactivate panel commands. The user can change the conference back to its original mode, either lecture-mode or fully interactive-mode videoconferences. Each of these actions taken by the user translates into a different message transmitted from controlling client 303 to conference manager 401.

FIGS. 7 through 9 depict message flow diagrams and flow charts that represent at least some of the salient, operational logic of conference manager 401 and some of the other elements in telecommunications system 300, involved in provisioning and managing a teleconference, in accordance with the illustrative embodiment of the present disclosure.

In regard to the methods represented by the disclosed operations and messages, it will be clear to those having ordinary skill in the art, after reading the present disclosure, how to make and use alternative embodiments of the disclosed methods wherein the recited operations, sub-operations, and messages are differently sequenced, grouped, or sub-divided—all within the scope of the present disclosure. It will be further clear to those skilled in the art, after reading the present disclosure, how to make and use alternative embodiments of the disclosed methods wherein some of the described operations, sub-operations, and messages are optional, are omitted, or are performed by other elements and/or systems.

FIG. 7 depicts a message flow diagram associated with establishing a media link from endpoint 302-1 and as part of a teleconference, and associated with reporting that event to conference manager 401 and controlling client 303, in accordance with the illustrative embodiment of the present disclosure.

In accordance with the illustrative embodiment of the present disclosure, at least some of the messages are exchanged in accordance with the Session Initiation Protocol (SIP). As those who are skilled in the art will appreciate, after reading this specification, one or more of the depicted SIP messages can be based on a different protocol.

FIG. 7 depicts the setting up of a video/UC session between endpoint 302-1 and MCU 404, which serves as an audio and video bridge. As those who are skilled in the art will appreciate after reading this specification, a different type of bridge can be contacted to set up a different type of session (e.g., audio only, etc.).

At operation 701, based on an indication it detects from its user, endpoint (EP) 302-1 transmits INVITE message 703 to MCU 404.

At operation 705, based on having received message 703 and possibly on intermediary results that are not depicted, MCU 404 transmits reINVITE message 707 to endpoint 302-1. This serves to complete the setup of video/unified communications session 709 between endpoint 302-1 and MCU 404, resulting in the commencement of the session.

At operation 711, based on detecting session 709 having commenced, MCU 404 transmits message 713 to event distributor 403. In response to receiving message 713, event distributor 403 at operation 715 checks to see that it has been previously instructed to monitor for events related to the current conference (i.e., in a subscription from conference manager 401) and, as a result, transmits message 717 to conference manager 401. This message indicates to manager 401 that a connection now exists between endpoint 302-1 and MCU 404 for the particular conference identified. In some alternative embodiments, message 717 or equivalent can be sent to manager 401 from a different element and/or at a different point in the depicted message flow, in order to indicate that the aforementioned connection exists.

At operation 719, based on having received message 717, manager 401 transmits message 721 to controlling client 303, updating client 303 of endpoint 302-1 having joined the teleconference. In some embodiments of the present disclosure, client 303 updates conference roster 600 accordingly to reflect that the participant at endpoint 302-1 has joined the particular teleconference.

The aforementioned operations describe how endpoint 302-1 gets added to a teleconference. It is in this way that the other endpoints can be added to the teleconference as well, in which conference manager 401 is informed about the other endpoints being added to the conference (i.e., add events). Similarly, MCU 404 can notify event distributor 403 whenever an endpoint drops from a teleconference; accordingly conference manager 401 and controlling client 303 can be updated as well (i.e., drop events). In some embodiments of the present disclosure, manager 401's treatment of one or more panels can be based on one or more such add or drop events that it receives.

FIG. 8 depicts the modifying of the membership of a conference panel, in accordance with the illustrative embodiment of the present disclosure. At operation 801, controlling client 303 receives (e.g., from its user, etc.) a command identifying one or more participants, in a first group of participants, as belonging to a first conference panel.

At operation 803, client 303 transmits a REST API call to conference manager 401, based on the command received at operation 801.

At operation 805, in response to receiving the API call from client 303, conference manager 401 modifies a first database record to identify the one or more participants, received in the API call, as belonging to the first conference panel. Manager 401 then transmits acknowledgment message 807 back to client 303. In some embodiments of the present disclosure, client 303 updates conference roster 600 accordingly.

The aforementioned operations describe the adding of one or more participants to a conference panel. As those who are skilled in the art will appreciate after reading this specification, a similar sequence of operations and messages can be used to delete one or more participants from the conference panel, or otherwise modify the conference panel. Furthermore, a similar sequence of operations and messages can be used to modify (e.g., add, delete, etc.) the membership of a second conference panel and additional conference panels. In fact, there can be a number of additional use cases that can be associated with conference management as disclosed herein, including creating a panel itself, modifying a panel in some way other than adding or deleting one or more participants, retrieving a panel, and deleting a panel itself, any of which can be specified by controlling client 303 to, and acted upon by, conference manager 401 via a message flow similar to that depicted in FIG. 8. In some embodiments of the present disclosure, manager 401's treatment of one or more participants within one or more panels can be based on one or more prior treatments of one or more participants within one or more panels.

FIG. 9 depicts the application of a muting treatment to a conference panel, in accordance with the illustrative embodiment of the present disclosure. For illustrative purposes, the scenario below concerns audio muting and unmuting. As those who are skilled in the art will appreciate after reading this specification, muting treatment can be applied to only the video of the affected endpoints (i.e., disallow or allow video), or to both the audio and video of the affected endpoints, or for a different type of media to which muting/unmuting (or the equivalent) is germane (e.g., disallow or allow chat messages, disallow or allow sharing of content, etc.).

At operation 901, controlling client 303 receives (e.g., from its user, etc.) a command identifying a first muting treatment to be applied to a teleconference. The first muting treatment can identify a particular conference panel or panels, or a muting state (e.g., "mute", "unmute", etc.) to apply to a particular conference panel or panels, or both. In some embodiments of the present disclosure, indicating that a particular panel is to be unmuted is referred to as "activating" that panel. As those who are skilled in the art will appreciate after reading this specification, however, the action of activating (or deactivating) a panel can signify activating (or deactivating) a predetermined feature (e.g., dropping a panel from the teleconference, etc.) such that i) it applies to all participants who are members of the panel and, optionally, ii) it does not apply to one or more participants who are not members of the panel. In other words, the term "muting treatment" can be replaced with "feature activation treatment", or "activation treatment", or equivalent, in some embodiments of the present disclosure.

At operation 903, client 303 transmits a REST API call to conference manager 401, based on the command received at operation 901. In some embodiments of the present disclosure, the API call indicates that the first muting treatment identified in the command is to be applied.

At operation 905, in response to receiving the API call from client 303, conference manager 401 transmits one or more messages 907 to MCU 404, indicating that the first muting treatment identified in the command transmitted by client 303 is to be applied. In some embodiments of the present disclosure, manager 401 bases the transmitting of message 907 in part on message 717 having been received indicating that an endpoint affected by the first muting treatment has been added to the teleconference. One or more messages 717 indicate the endpoints of and/or the participants in the affected groups (e.g., panels, participants who are not in any panel, etc.).

At operation 909, and in response to receiving message 907, MCU 404 applies the first muting treatment to the teleconference such that i) a first muting state is applied to all of the participants in the first group as identified in the first database record and ii) a second muting state is applied to at least one of the participants in the second group, concurrently with each other. For example and without limitation, the first muting state can correspond to unmuting of the audio originating by participants of the teleconference to whom the first muting state is applied; the second muting state can correspond to muting of the audio originated by participants to whom the second muting state is applied.

As another example, the first muting state can correspond to unmuting of the audio originated by participants to whom the first muting state is applied such that only the participants to whom the first muting state is applied receive the unmuted audio. A variation of this is to mute the audio that is incoming to those participants who are not members of the first group discussed above. In this way, only participants belonging to the panel can hear each other. Hence, conference manager 401 can enable a panel to go into a private discussion and then reconvene as a larger group, analogous to a breakout session in an in-person meeting. Similarly, the conference manager can exclude a predetermined one or more participants and/or panels from being able to hear and/or view a panel in a private discussion, which can be useful during an interview or negotiation, for example and without limitation.

Regarding the second muting state, in some embodiments of the present disclosure, the second muting state can be applied to all of the participants in the second group.

MCU 404 also transmits message 911 to event distributor 403, based on the application of the muting treatment described above. In response to receiving message 911, event distributor 403 at operation 913 checks to see that it has been previously instructed to monitor for events related to the current conference (i.e., in a subscription from conference manager 401) and, as a result, transmits message 913 to conference manager 401. This message indicates to manager 401 that a particular muting treatment has been applied for the particular conference identified. In some alternative embodiments, message 915 or equivalent can be sent to manager 401 from a different element and/or at a different point in the depicted message flow.

At operation 917, based on having received message 915 providing an event update, manager 401 transmits message 919 to controlling client 303, updating client 303 of the particular muting treatment having been applied to the teleconference. In some embodiments of the present disclosure, client 303 updates conference roster 600 accordingly to reflect the muting treatment applied.

The aforementioned operations describe the applying of a first muting treatment to a first conference panel and to possibly other participants of a teleconference as well. As those who are skilled in the art will appreciate after reading this specification, a similar sequence of operations and messages can be used to apply a different muting treatment (or feature activation treatment, as discussed above) to the first conference panel, the same or a different muting treatment to a different conference panel, or particular type of muting treatment to one or more participants who do not belong to a conference panel. Furthermore, in some embodiments of the present disclosure, manager 401's treatment of one or more panels can be based on one or more muting treatment events that it receives.

In various embodiments of the present disclosure, conference manager 401, in concert with one or more of the other elements in telecommunications system 300, is capable of providing the following functionalities, alone or in any combination with one another:
  i. Conference participants can be organized (pre-configured) into panels.
  ii. One or more panels can be activated or de-activated via single command actions.
  iii. Control of multiple panels can be independent of each other and/or of non-panel participants.
  iv. One or more operations that the underlying MCU 404 supports can be directed to any or all participants or panels.
  v. Behaviours and/or states of conference participants can be modified independently of one or more panels and their members.
  vi. Behaviour and/or state changes made at the panel level can be independent of the general conference participant roster.
  vii. Panels and/or their behaviours can be easily controlled via an API which can be adapted into higher-level management abstractions.

Furthermore, one or more of the messages and/or data contained within the messages can be processed (e.g., transmitted, received, acted upon, etc.) such that the afore-listed functionalities are implemented.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for controlling a teleconference comprising:
  modifying, by a first data-processing system, a first database record to identify a first group of participants in a teleconference as belonging to a first panel, wherein the teleconference is preconfigured to have, in addition to the first group of participants, a second group of participants who are non-members of the first panel;
  receiving, by the first data-processing system, a first representational state transfer (REST) application program interface (API) call from a second data-processing system indicating that a first muting treatment is to be applied to the teleconference; and
  applying, by the first data-processing system to the teleconference, the first muting treatment such that i) a first muting state is applied to all of the participants in the first group as identified in the first database record and ii) a second muting state is applied to at least one of the participants in the second group, concurrently with each other.

2. The method of claim 1 wherein the first muting state corresponds to unmuting of the audio originated by participants to whom the first muting state is applied and the second muting state corresponds to muting of the audio originated by participants to whom the second muting state is applied.

3. The method of claim 2 wherein at least one of the first muting state and second muting state corresponds to unmuting of the audio originated by participants to whom the first muting state is applied such that only the participants to whom the first muting state is applied receive the unmuted audio.

4. The method of claim 1 wherein the second muting state is applied to all of the participants in the second group.

5. The method of claim 1 further comprising:
  modifying, by the first data-processing system, a database record to identify a third group of participants in a teleconference as belonging to a second panel;
  receiving, by the first data-processing system, a second REST API call from the second data-processing system indicating that a second muting treatment is to be applied to the teleconference; and
  applying, by the first data-processing system to the teleconference system, the second muting treatment to the teleconference such that i) the first muting state is applied to all of the participants in the third group and ii) the second muting state is applied to at least one of the participants in the second group, concurrently with each other.

6. The method of claim 5 wherein the second muting state is also applied to at least one of the participants in the first group.

7. The method of claim 5 wherein at least one participant is in both the first and second groups.

8. The method of claim 1 further comprising modifying, by a first data-processing system, a second database record to identify a first participant in the teleconference; wherein the first and second muting states are applied such that the first participant is excluded from any muting.

9. The method of claim 1 wherein the applying of the first muting treatment comprises transmitting a message to a multipoint control unit (MCU) that indicates all of the participants in the first group and the at least one of the participants in the second group, and their respective muting states.

10. The method of claim 1 further comprising receiving, by the first data-processing system, a third REST API call from the second data-processing system identifying the first group of participants as belonging to the first panel, wherein the modifying of the first database record is based on the receiving of the third REST API call.

11. A non-transitory computer-readable medium storing a computer program comprising computer-readable instructions that, when loaded and executed on a computer system, cause the computer system to perform the steps of a method according to claim 1.

12. A conference system for controlling a teleconference comprising:
a first data-processing system comprising:
(i) a processor that is configured to modify a first database record to identify a first group of participants in a teleconference as belonging to a first panel, wherein the teleconference is preconfigured to have, in addition to the first group of participants, a second group of participants who are non-members of the first panel, and
(ii) a receiver that is configured to receive a first representational state transfer (REST) application program interface (API) call from a second data-processing system indicating that a first muting treatment is to be applied to the teleconference; and
a first bridging device that is configured to apply the first muting treatment to the teleconference such that i) a first muting state is applied to all of the participants in the first group as identified in the first database record and ii) a second muting state is applied to at least one of the participants in the second group, concurrently with each other.

13. The conference system of claim 12 wherein the first muting state corresponds to unmuting of the audio originated by participants to whom the first muting state is applied and the second muting state corresponds to muting of the audio originated by participants to whom the second muting state is applied.

14. The conference system of claim 13 wherein at least one of the first muting state and second muting state corresponds to unmuting of the audio originated by participants to whom the first muting state is applied such that only the participants to whom the first muting state is applied receive the unmuted audio.

15. The conference system of claim 12 wherein the second muting state is applied to all of the participants in the second group.

16. The conference system of claim 12 wherein:
the processor of the first data-processing system is further configured to modify a database record to identify a third group of participants in a teleconference as belonging to a second panel;
the receiver of the first data-processing system is further configured to receive a second REST API call from the second data-processing system indicating that a second muting treatment is to be applied to the teleconference; and
the first bridging device is further configured to apply the first muting treatment to the teleconference such that i) the first muting state is applied to all of the participants in the third group and ii) the second muting state is applied to at least one of the participants in the second group, concurrently with each other.

17. The conference system of claim 16 wherein the second muting state is also applied to at least one of the participants in the first group.

18. The conference system of claim 16 configured to accommodate at least one participant being in both the first and second groups.

19. The conference system of claim 12 wherein the processor is further configured to modify a second database record to identify a first participant in the teleconference; wherein the first and second muting states are applied such that the first participant is excluded from any muting.

20. The conference system of claim 12 wherein the first bridging device comprises a multipoint control unit (MCU) that applies the first and second muting states.

\* \* \* \* \*